(12) United States Patent
Lou

(10) Patent No.: US 7,389,454 B2
(45) Date of Patent: Jun. 17, 2008

(54) ERROR DETECTION IN USER INPUT DEVICE USING GENERAL PURPOSE INPUT-OUTPUT

(75) Inventor: Wenkwei Lou, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1082 days.

(21) Appl. No.: 10/630,123

(22) Filed: Jul. 30, 2003

(65) Prior Publication Data

US 2004/0025097 A1    Feb. 5, 2004

Related U.S. Application Data

(60) Provisional application No. 60/400,019, filed on Jul. 31, 2002, provisional application No. 60/399,962, filed on Jul. 31, 2002.

(51) Int. Cl.
*G01R 31/28*    (2006.01)

(52) U.S. Cl. .................. 714/726; 714/738; 714/733; 341/26; 345/163; 345/164; 345/165; 345/166; 345/167; 345/168; 361/680

(58) Field of Classification Search .................. 714/738, 714/726, 733; 341/26; 345/163–168; 361/680
See application file for complete search history.

(56) References Cited

U.S. PATENT DOCUMENTS 6,535,146 B1 *    3/2003    Chang et al. .................. 341/26

* cited by examiner

*Primary Examiner*—Guy J Lamarre
(74) *Attorney, Agent, or Firm*—Garlink Harrison & Markison; Bruce E. Garlink

(57) ABSTRACT

A method and apparatus are disclosed for using a general purpose input-output (GPIO) interface to test a user input device such as a wireless keyboard or mouse. Operation of key-scan logic can be tested by the GPIO interface by temporarily disconnecting the outputs of the various rows and columns and substituting signals generated by a test algorithm into the input terminals of the key-scan logic. The test signal is processed by the key scan circuitry and a key-scan output signal is generated. This key-scan output signal is then compared to a known reference output signal to determine if the key-scan logic and associated circuitry is operating properly. Other embodiments of the GPIO testing system can be used to test other user devices such as a computer mouse/scrolling device.

7 Claims, 14 Drawing Sheets

ERROR DETECTION IN USER INPUT DEVICE USING GENERAL PURPOSE INPUT-OUTPUT

CROSS-REFERENCE TO RELATED APPLICATIONS

The present application is related to U.S. patent application Ser. No. 60/400,019, entitled "High Performance, Low Power Key Matrix Scanner," filed on Jul. 31, 2002, by Wenkwei Lou as inventor and assigned to Broadcom Corporation, and incorporated herein by reference.

The present application is related to U.S. patent application Ser. No. 60/399,962, entitled "Improved Error Rejection for Optical Scroll Wheel," filed on Jul. 31, 2002, by Wenkwei Lou as inventor and assigned to Broadcom Corporation, and incorporated herein by reference.

By this reference, each of the above-referenced patent applications are fully incorporated herein for all purposes.

BACKGROUND

1. Technical Field

The present invention relates generally to digital computers; and more particularly to a method and apparatus for detecting errors in human interface devices for communicating with digital computers.

2. Related Art

There are many user input devices for use with a digital computer, including standard keyboards, touchpads, mice and trackballs. In order to ensure accurate operation of a user input device, it is important to have a means to test operation of the circuitry in the device. Prior art methods for performing such tests are typically conducted at the factory at the time the device is fabricated. Some prior art testing techniques for keyboards and mice include direct testing of the actual device by electromechanical devices, such as robots. Other prior art techniques using testing algorithms are typically performed by electronic devices in the factory with no means to test the device once it has left the factory.

Wireless communication technology has advanced rapidly over the past few years and there has been rapid development of wireless technologies for providing communication between input/output devices and their "host" computers. These "wireless" input devices are highly desirable since they do not require any hard-wired connections with their host computers. However, the lack of a wired connection also requires that the wireless input devices contain their own power supply, i.e., that they be battery powered.

To extend the life of its batteries, a wireless input device often supports power saving modes of operation. For example, a wireless interface may include circuitry to provide for various levels of "power-down" modes to reduce power consumption when the device is inactive. When activity is detected, the interface circuitry will transition to a powered-up mode to facilitate communications between the user interface device and the computer and will then return to a power-down mode after a predetermined interval of inactivity of the user interface device.

When a wireless device transitions from one of the various power-down modes to powered-up mode, it is useful to perform a quick check of the circuitry to ensure that the device is in proper condition for error-free operation. Likewise, after a wireless device has been powered-down to change the batteries, it is important to perform a self-test of the device's circuitry after the device returns to a powered-up state. In both of these situations, it is essential that the test consumes minimum power.

Heretofore, there has not been any power-conserving method or apparatus that provides for effective testing of a user input device, such as a keyboard or mouse, once the device has left the factory. Thus, there is a need in the art for a method and apparatus for testing a user input device such as a keyboard or mouse while consuming a minimal amount of power, thereby allowing a wireless input device to operate in an error-free condition for an extended period on a single battery life.

SUMMARY OF THE INVENTION

The present invention overcomes the shortcomings of the prior art by providing a method and apparatus for using a general purpose input-output (GPIO) interface that is operable to test a user input device such as a wireless keyboard or mouse. The GPIO is used to execute a test algorithm that may be in the form of a "minidriver" for testing operation of various circuit components in the user input device. The test algorithm can be accessed via a variety of storage media, such as a read-only memory (ROM) or an electrically erasable programmable read-only memory (EEPROM). Alternatively, the minidriver can be downloaded by implementing an over-the-air download (OTAD) via the wireless link between the host computer and the user input device.

In one embodiment of the present invention, the GPIO testing system operates in conjunction with a user input device such as a wireless keyboard comprising a switch matrix having a plurality of rows and columns with electrical switches operable to connect electrical contacts associated with the junctions of various rows and columns thereon. In a first operating state, corresponding to normal operation, activation of the keys on the switch matrix is detected by key-scan logic that is operable to detect transitions in the voltage levels of the various rows and columns in the key matrix. In the present invention, the operation of the key-scan circuitry can be tested by placing the circuitry in a second operating state by temporarily bypassing or disabling the outputs of the various rows and columns and substituting signals generated by a test algorithm into the input terminals of the key-scan logic. The test signals are delivered via the GPIO and a test control bus to the inputs of the key scan matrix circuitry. The test signal is processed by the key scan circuitry and a key-scan output signal is generated. This key-scan output signal is then compared to a known reference output signal to determine if the key-scan logic and associated circuitry is operating properly.

In an alternate embodiment of the present invention, the GPIO testing system operates in conjunction with other user devices such as a computer mouse/scrolling device. In a first state corresponding to normal operation of the mouse/scrolling device, optical or mechanical sensors generate motion information signals that are provided to quadrature state change detection circuitry that is operable to provide a position change interrupt signal indicating movement of the mouse/scrolling device. In this embodiment, the GPIO testing system is operable to transition to a second operating state wherein the motion information signals are temporarily bypassed or disabled and a plurality of test signals are provided via the GPIO to the input of the quadrature state change detection circuitry. The test signal is processed by the quadrature state change detection circuitry and a quadrature output signal is generated. This quadrature output signal is then compared to a known reference output signal to determine if the quadrature state change detection circuit and associated circuitry is operating properly.

The GPIO testing method and apparatus of the present invention is particularly useful for ensuring error-free operation of wireless user input devices. In a wirelessly enabled system, a wireless interface device services communications between a wirelessly enabled host and at least one user input device. The wireless interface device includes a wireless interface unit, a processing unit, an input/output unit, and a power management unit. The wireless interface unit wirelessly interfaces with the wirelessly enabled host using a communication interface protocol. The power management unit operably couples to the wireless interface unit, the processing unit, and the input/output unit. The power management unit operates to control the power consumption of the wireless interface unit and the processing unit by powering down the wireless interface device and the processing unit. The input/output unit remains powered to detect user input. When user input is detected, the wireless interface unit and processing unit are powered-up for normal operations.

The method and apparatus of the present invention can be implemented to test the operation of circuitry after the user input device transitions from a powered-down state to normal operating state. The GPIO testing system can also be used to test the operation of the circuitry after the user input device has been powered down for a maintenance operation, such as battery replacement. While the GPIO method and apparatus of the present invention has been discussed thus far in connection with wireless devices, those of skill in the art will appreciate that the GPIO testing system of the present invention can be used to test circuitry in a number of situations, such as during manufacturing, during design and development activities related to stress testing and also in various field testing operations.

Other aspects of the present invention will become apparent with further reference to the drawings and specification, which follow.

DETAILED DESCRIPTION OF THE DRAWINGS

Figure 1A:
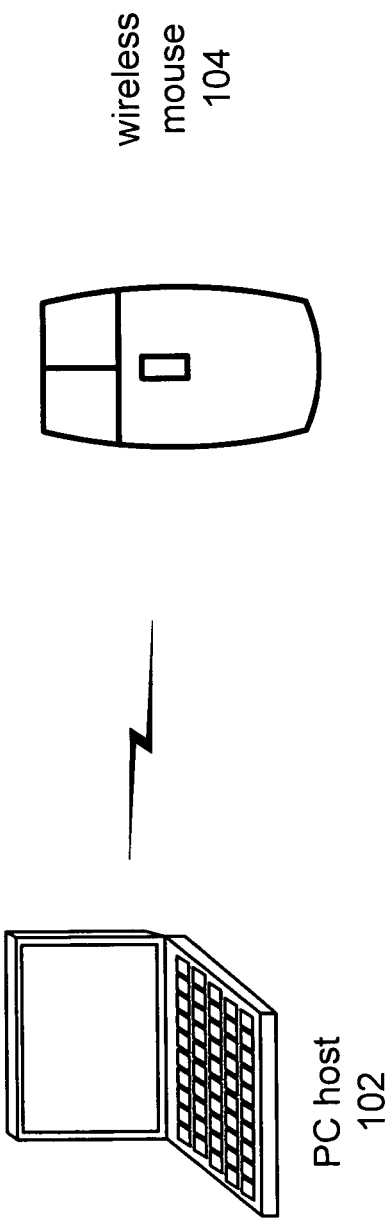
FIG. 1A is a system diagram illustrating a PC host and a wireless mouse that includes a wireless interface device constructed according to the present invention.

FIG. 1A is a system diagram illustrating a PC host 102 and a wireless mouse 104 that includes a wireless interface device constructed according to the present invention. As shown in FIG. 1A, the PC host 102 wirelessly couples to the wireless mouse 104. In the structure of FIG. 1A, the wireless mouse 104 includes a wireless interface device that operates to place the wireless mouse in any of a number of reduced power operating modes, including a power down mode in which battery life is substantially extended.

Figure 1B:
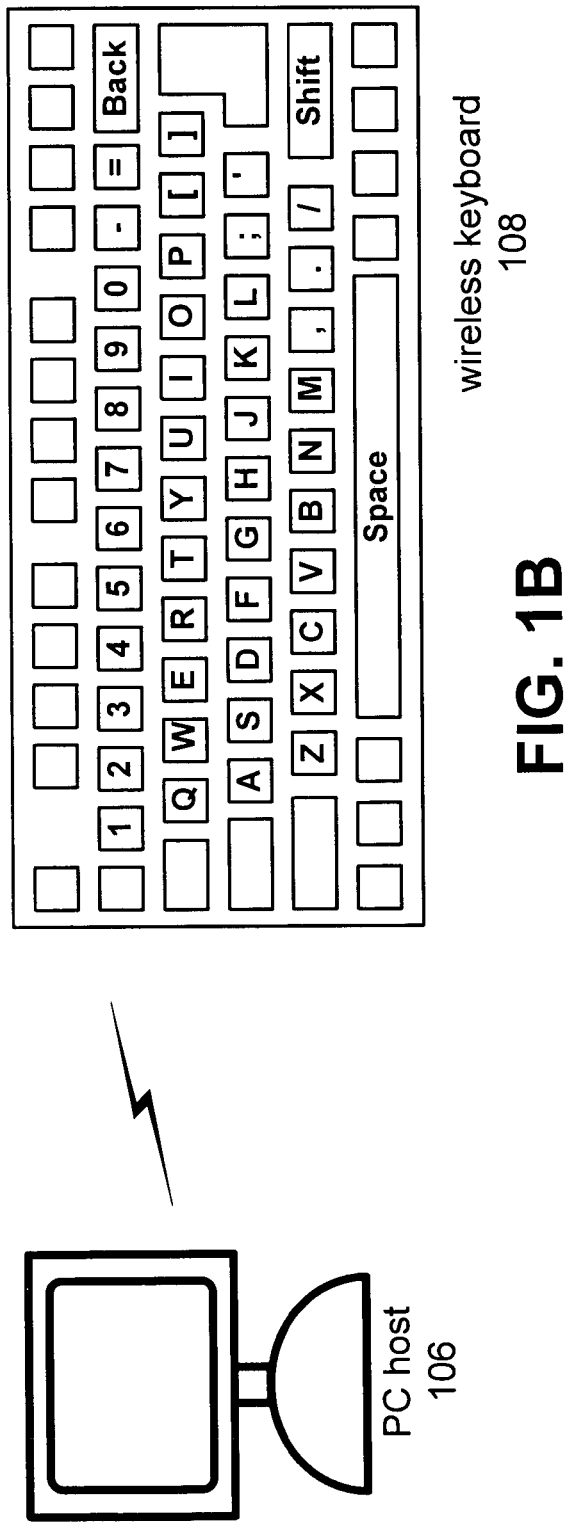
FIG. 1B is a system diagram illustrating a PC host and a wireless keyboard that includes a wireless interface device constructed according to the present invention.

FIG. 1B is a system diagram illustrating a PC host 106 and a wireless keyboard 108 that includes a wireless interface device constructed according to the present invention. The wireless keyboard 108 is battery powered and operates for extended periods of time on a single set of batteries because of the greatly reduced power consumption operations according to the present invention.

Figure 2:
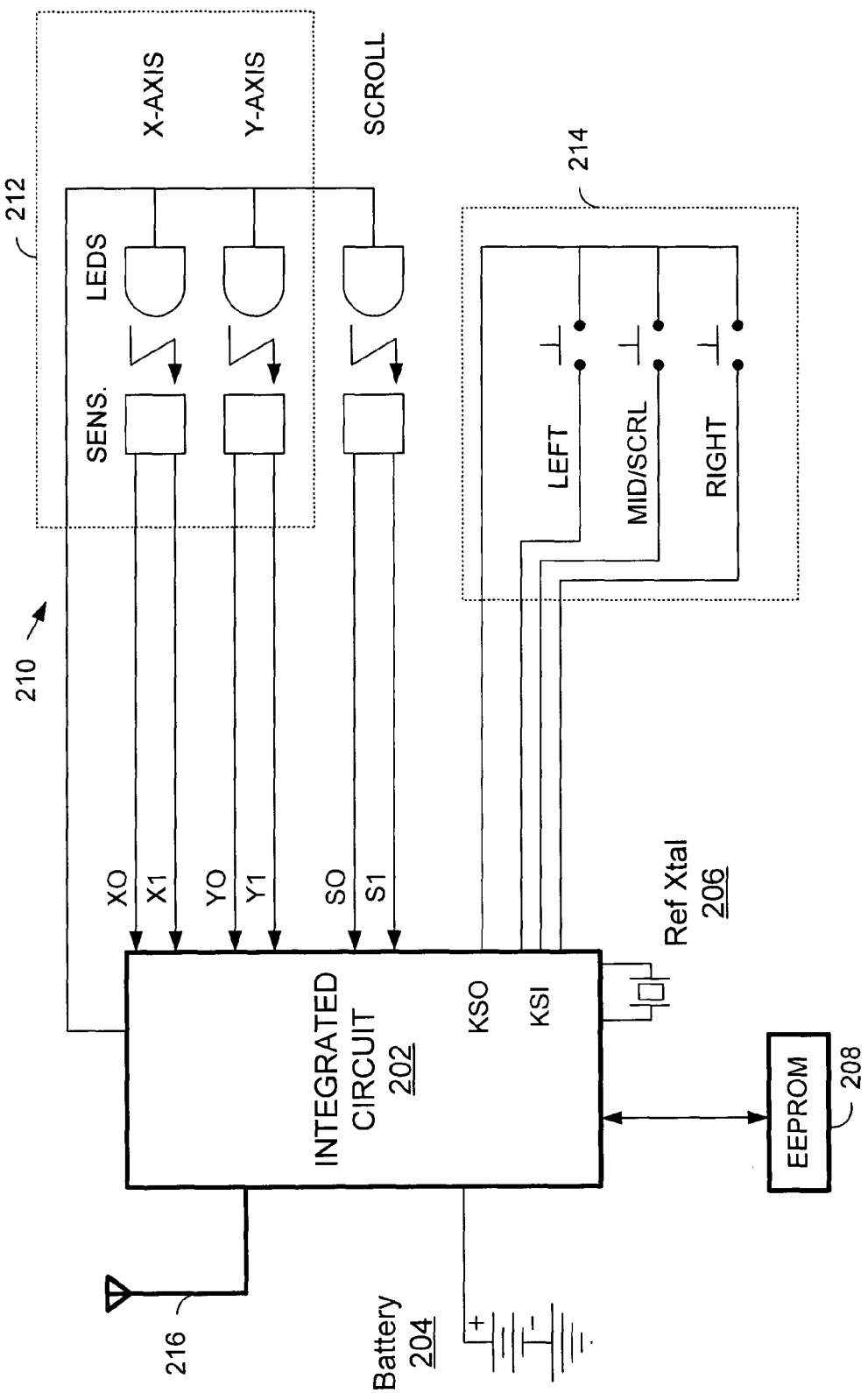
FIG. 2 is a schematic block diagram illustrating the structure of a wireless mouse that includes a wireless interface device constructed according to the present invention.

FIG. 2 is a schematic block diagram illustrating the structure of a wireless mouse that includes a wireless interface device constructed according to the present invention. An integrated circuit 202 constructed according to the present invention serves as the wireless interface device and couples to various mouse inputs 210. These mouse inputs 210 include x-axis and y-axis inputs as well as a scroll input. The x-axis and y-axis inputs are often referred to a "quadrature" inputs. The components that produce the quadrature inputs are generally referred to at numeral 212 and may be constructed from optical inputs instead of from conventional mechanical inputs. Referenced via numeral 214 are the button inputs that are typical with a computer mouse and include the left button input, the middle/scroll button input, and the right button input. As is shown, each of the signals produced by the mouse are received by integrated circuit 202.

Integrated circuit 202 also couples to battery 204, crystal 206 that produces a 12 MHz reference frequency, EEPROM 208, and antenna 216. In one embodiment of the present invention, battery 204 comprises a pair of either AA batteries or AAA batteries. Antenna 216 is an internal antenna in the described because of the size constraints of the mouse and because of the relatively short distance between the PC host and the wireless mouse.

Figure 3:
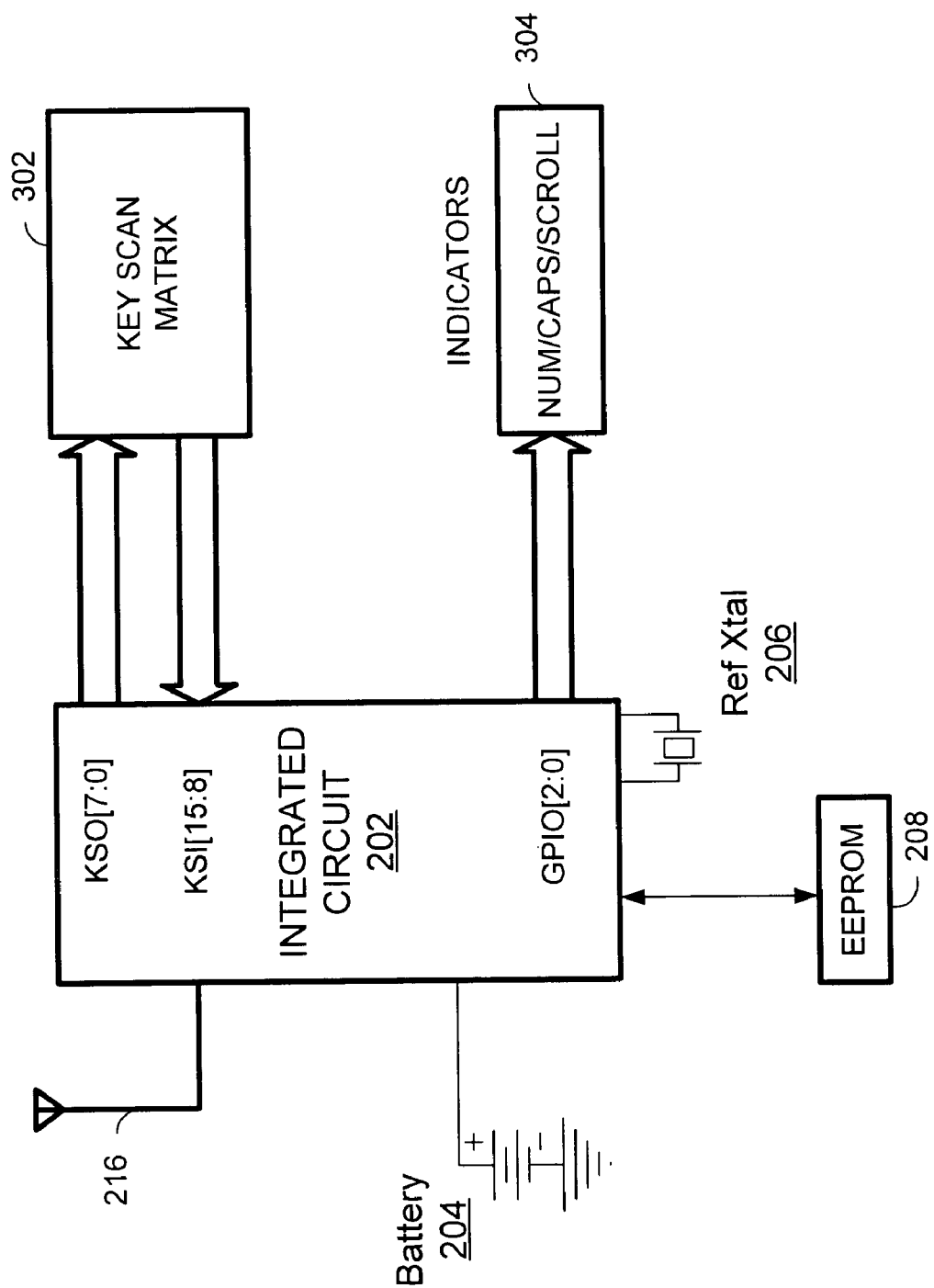
FIG. 3 is a schematic block diagram illustrating the structure of a wireless keyboard that includes a wireless interface device constructed according to the present invention.

FIG. 3 is a schematic block diagram illustrating the structure of a wireless keyboard that includes a wireless interface device (integrated circuit 202) constructed according to the present invention. As shown in FIG. 3, integrated circuit 202 services a key scan matrix 302 that provides inputs from the keyboard. Indicators 304 include number, capitals, and scroll lights that are lit on the keyboard. The integrated circuit 202 couples to a battery 204, a crystal 206, an EEPROM 208, and an antenna 216.

In another embodiment (not shown in either FIG. 2 or FIG. 3), the integrated circuit 202 services both mouse and keyboard input and may reside internal to either the mouse or the keyboard. As will be apparent to those skilled in the art, multiplexing or signal sharing may be required, because the input signal differs. However, different signal lines may be dedicated for keyboard and for mouse inputs such that no signal sharing is required. As is apparent, when the integrated circuit 202 alone services both mouse and keyboard, input wired connectivity between the keyboard and the mouse is required.

Figure 4:
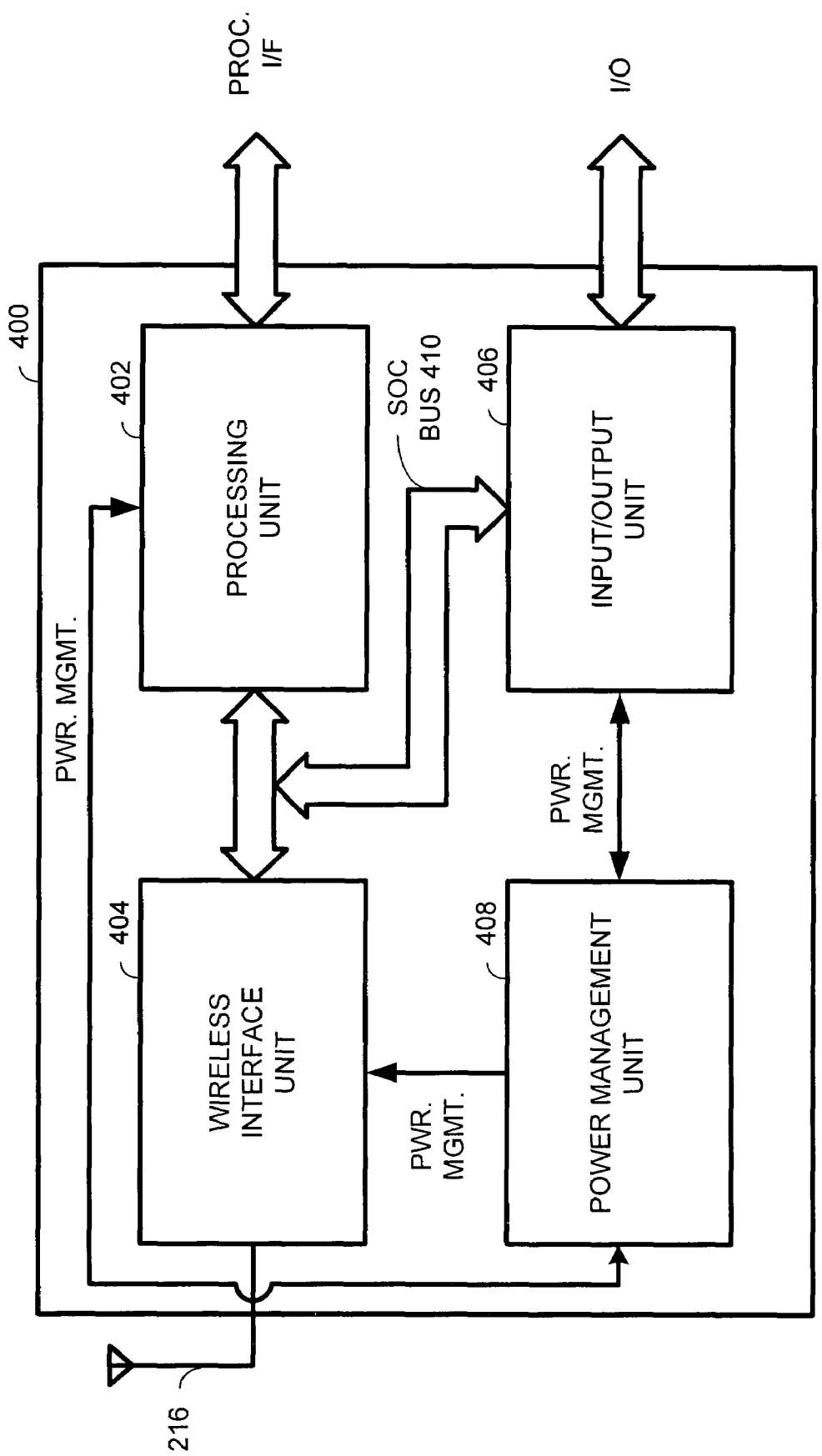
FIG. 4 is a block diagram illustrating a wireless interface device (integrated circuit) constructed according to the present invention.

FIG. 4 is a block diagram illustrating a wireless interface device (integrated circuit) constructed according to the present invention. As shown in FIG. 4, the wireless interface device 400 includes a processing unit 402, a wireless interface unit 404, an input/output unit 406, and a power management unit 408. The wireless interface unit 404 couples the wireless interface device 400 to antenna 216. The wireless interface unit 404 can be adapted to operate according to the Bluetooth specification and in particular to the Human Interface Device (HID) portion of the Bluetooth specification. It will be understood by those skilled in the art, however, that the present invention can be adapted to work in conjunction with other wireless interface standards.

Processing unit 402, wireless interface unit 404, and input/output unit 406 couple with one another via a system on a chip (SOC) bus 410. Processing unit 402 includes a processing interface that may be used to couple the processing unit to one or more devices. Input/output unit 406 includes an input/output set of signal lines that couple the wireless interface device 400 to at least one user input device, such as a mouse or the keyboard incorporating the improved scan circuit described herein below.

Figure 5:
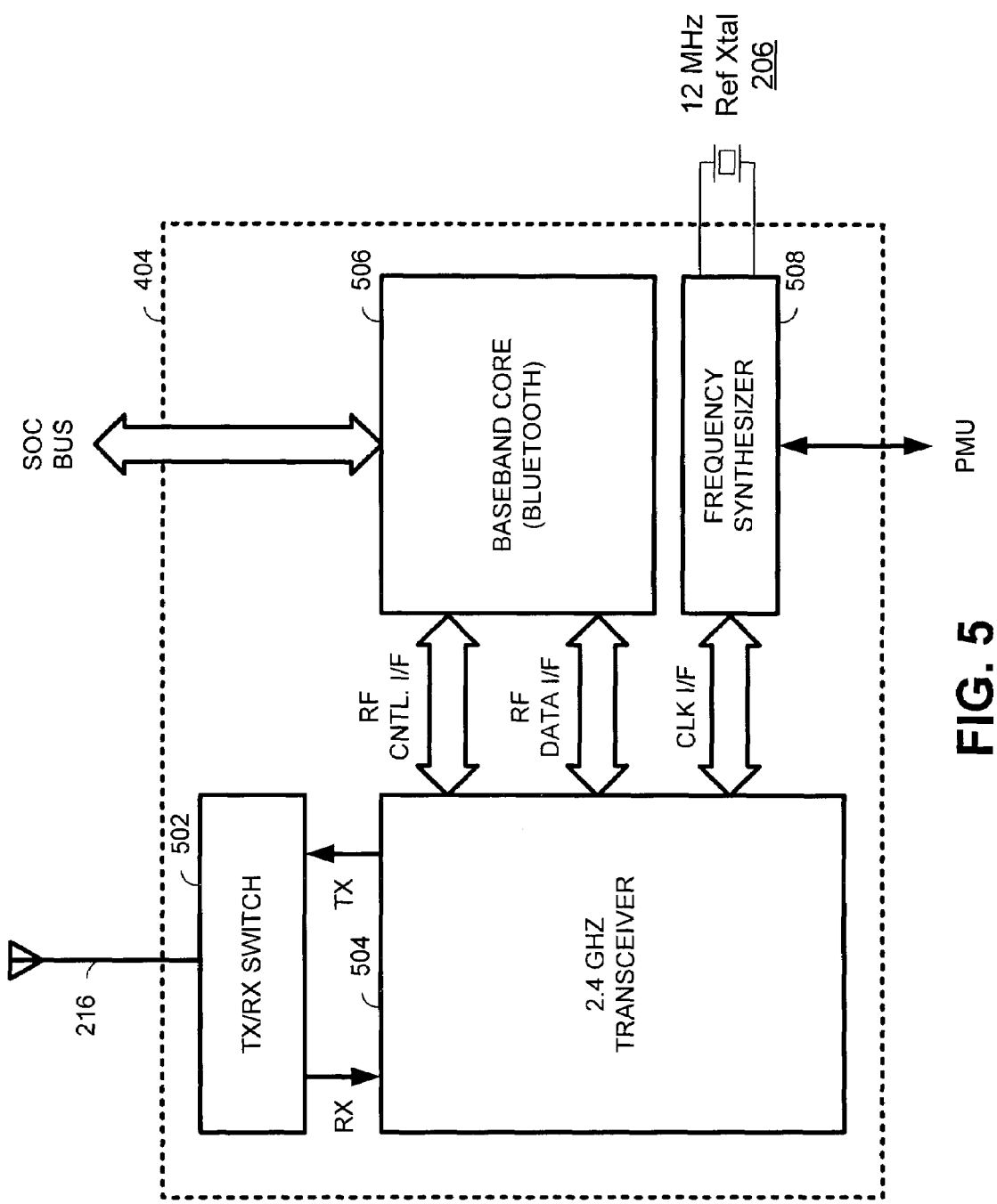
FIG. 5 is a block diagram illustrating a wireless interface unit of the wireless interface device of FIG. 4.

FIG. 5 is a block diagram illustrating a wireless interface unit of the wireless interface device of FIG. 4. The wireless interface unit 404 includes a transmit/receive switch 502, a 2.4 GHz transceiver 504, a baseband core 506 which may be compatible with the Bluetooth standard, and a frequency synthesizer 508. Each of these components is generally known in the field and will be described in minimal detail herein.

The transmit/receive switch 502 couples to antenna 216 and switches between transmit and receive operations. The 2.4 GHz transceiver 504 performs all RF front-end operations and operates within a frequency band and on particular channels as are specified by the Bluetooth operating standard. The 2.4 GHz transceiver 504 couples to baseband core 506. Such coupling is performed via an RF control interface and an RF data interface. The RF control interface performs the necessary control operations to guarantee that the 2.4 GHz transceiver 504 and the baseband core 506 will operate consistently with desired operating specifications. The RF data interface transfers both Rx and Tx data between the 2.4 GHz transceiver 504 and the baseband core 506. Frequency synthesizer 508 couples to the power management unit 408, to the external crystal 206 operating at 12 MHz, and to the 2.4 GHz transceiver 504. The frequency synthesizer 508 is controlled to provide an RF frequency for the 2.4 GHz transceiver 504 which is used to mix with the baseband signal received from the baseband core during a transmit operation and to mix with the received RF signal during a receive operation. The baseband core 506 couples to other wireless interface devices via the SOC bus 410.

Figure 6:
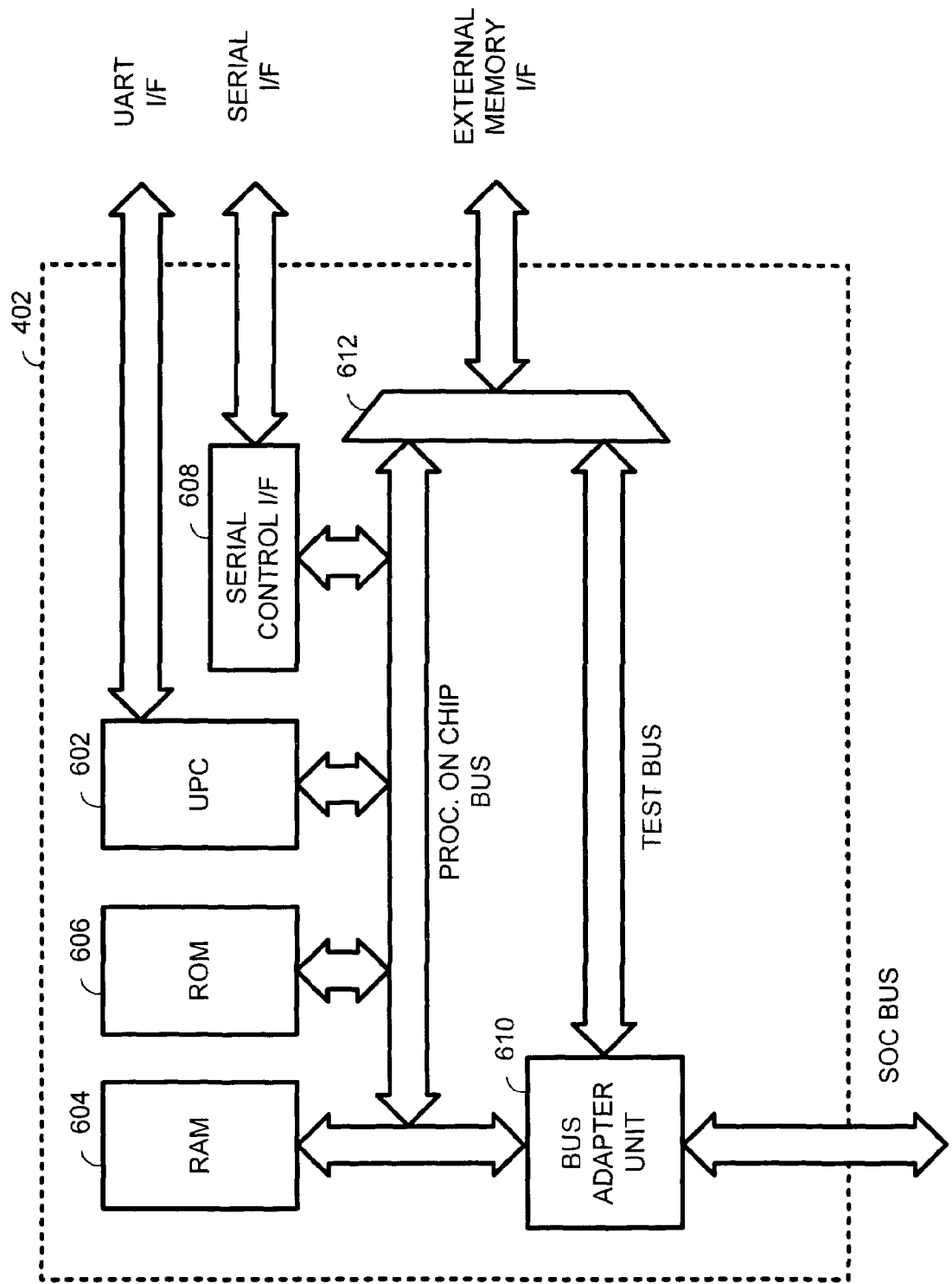
FIG. 6 is a block diagram illustrating a processing unit of the wireless interface device of FIG. 4.

FIG. 6 is a block diagram illustrating a processing unit 402 of the wireless interface device of FIG. 4. The processing unit 402 includes a microprocessor core 602, read only memory 606, random access memory 604, serial control interface 608, bus adapter unit 610, and multiplexer 612. The microprocessor core 602, ROM 606, RAM 604, serial control interface 608, bus adapter unit 610, and multiplexer 612 couple via a processor on a chip bus. Multiplexer 612 multiplexes an external memory interface between the processor on a chip bus and a test bus. The bus adapter unit 610 interfaces the processor on a chip bus with the SOC. The microprocessor core 602 includes a universal asynchronous receiver transmitter interface that allows direct access to the microprocessor core. Further, the serial control interface 608 provides a serial interface path to the processor on a chip bus.

Figure 7:
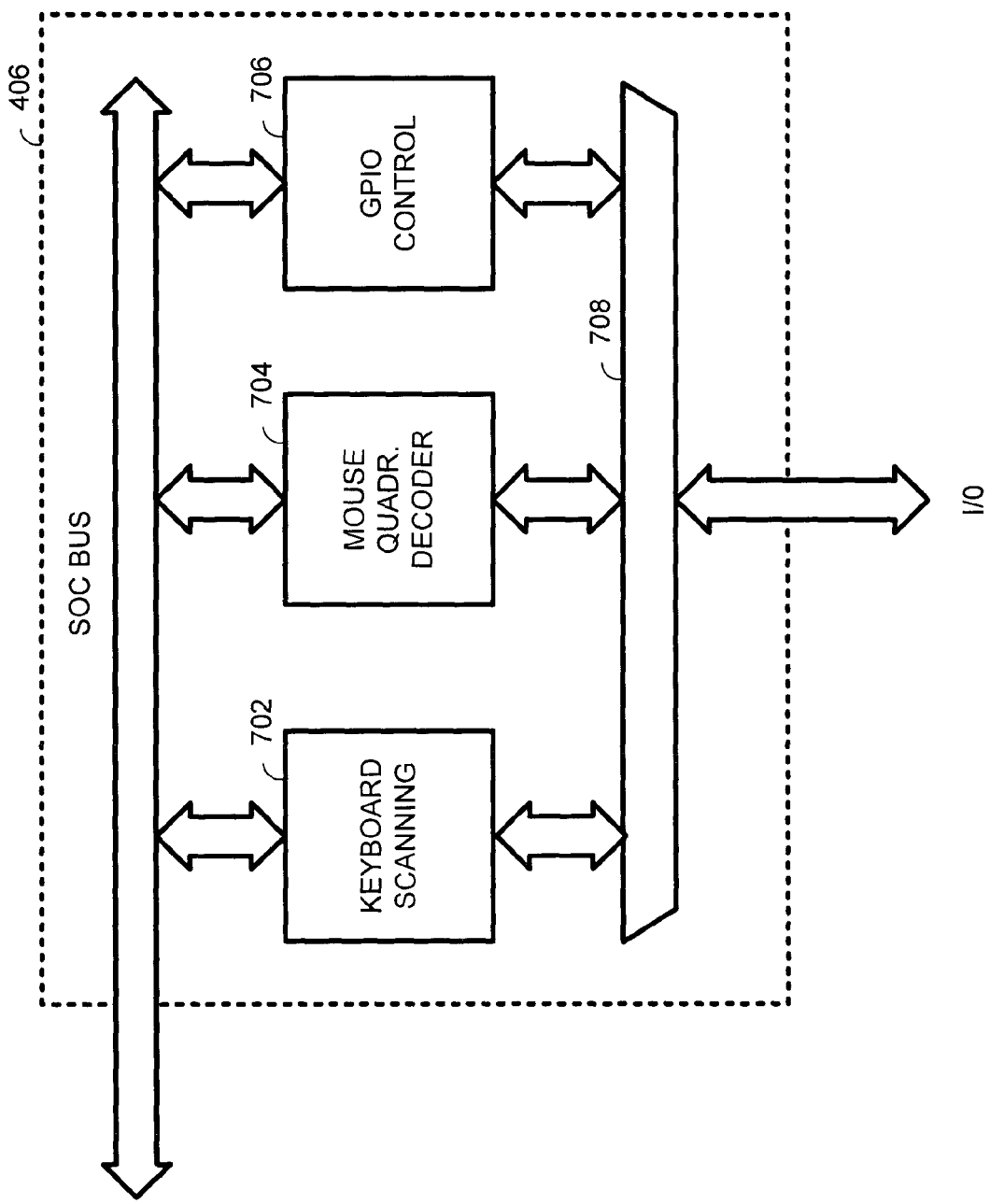
FIG. 7 is a block diagram illustrating an input/output unit of the wireless interface device of FIG. 4.

FIG. 7 is a block diagram illustrating an input/output unit 406 of the wireless interface device of FIG. 4. The input/output unit 406 includes a keyboard scanning block 702, a mouse quadrature decoder block 704, and a GPIO control block 706. Each of the keyboard scanning block 702, the mouse quadrature decoder block 704, and the GPIO control block 706 couple to the SOC bus. Further, each of the keyboard scanning block 702, the mouse quadrature decoder block 704, and the GPIO control block 706 couple to I/O via multiplexer 708. This I/O couples to the at least one user input device.

In another embodiment of the input/output unit 406, each of the keyboard scanning block 702, the mouse quadrature decoder block 704, and the GPIO control block 706 couples directly to external pins that couple to the at least one user input device.

Figure 8:
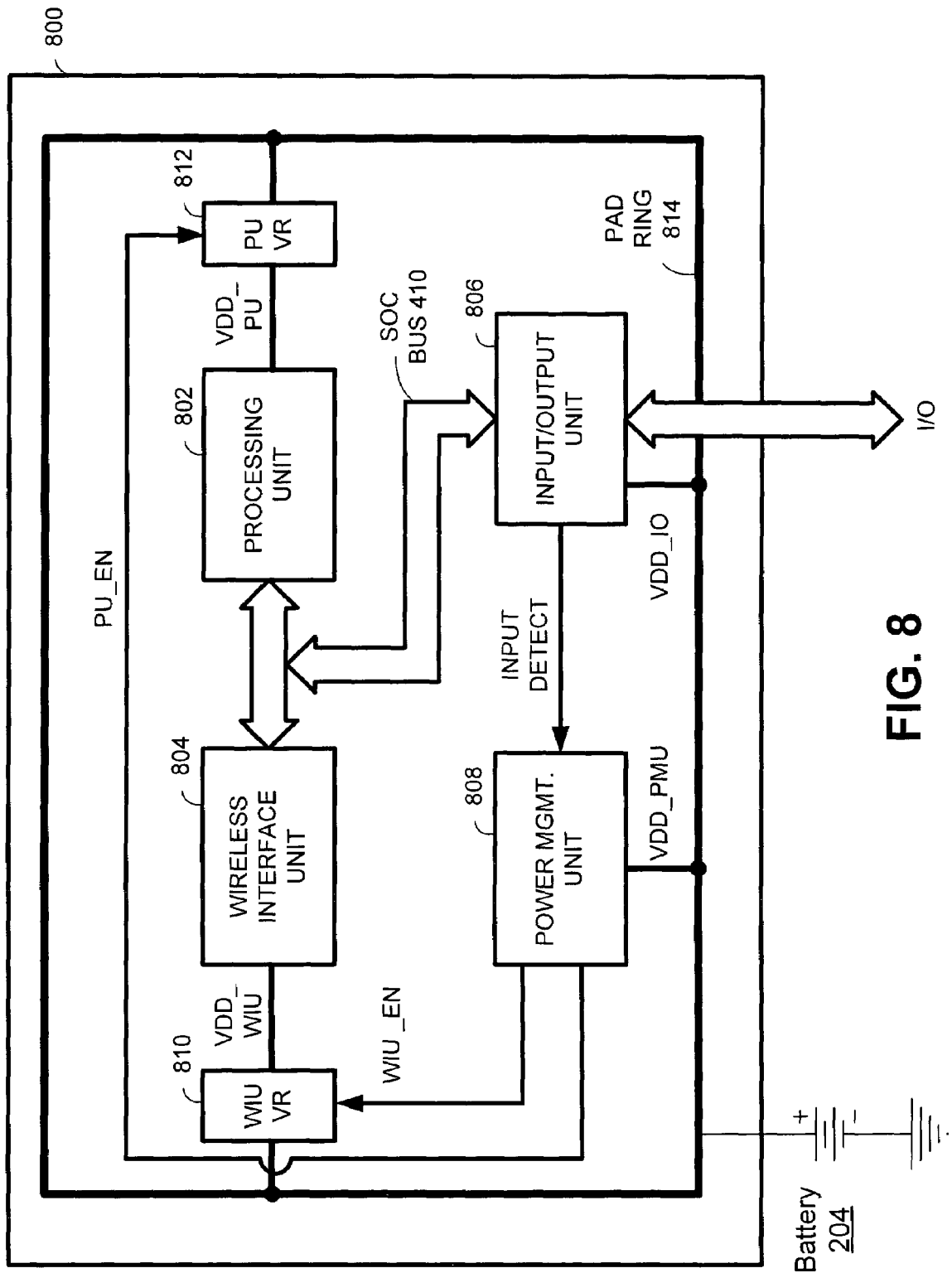
FIG. 8 is a block diagram generally showing the structure of an integrated circuit constructed according to the present invention with particular detail in the coupling of battery power to the units of the device.

FIG. 8 is a block diagram generally showing the structure of an integrated circuit constructed according to the present invention with particular detail in the coupling of battery power to the units of the device. Integrated circuit 800 of FIG. 8 includes a wireless interface unit 804, processing unit 802, input/output unit 806, and power management unit 808. The processing unit 802, wireless interface unit 804, and input/output unit 806 couple via a SOC bus 410. Further, as was previously described, input/output unit 806 couples to at least one user input device via I/O connection.

With the integrated circuit 800 of FIG. 8, a pad ring 814 surrounds a substantial portion of the components of the integrated circuit. The pad ring 814 couples directly to battery 204, which powers the pad ring. Further, input/output unit 806 and power management unit 808 couple directly to pad ring 814 to receive their power and voltage. However, processing unit 802 couples to pad ring 814 via processing unit voltage regulation circuitry 812. Further, the wireless interface unit 804 couples to pad ring 814 via wireless interface unit voltage regulation circuitry 810. The processing unit voltage regulation circuitry 812 is controlled by the power management unit 808 via control signal PU_EN. Further, the wireless interface unit voltage regulation circuitry 810 is controlled by the power management unit 808 using control signal WIU_EN.

The integrated circuit operates in four different power-conserving modes: (1) busy mode; (2) idle mode; (3) suspend mode; and (4) power down mode. Busy mode, idle mode, and suspend mode are described in the Bluetooth specification. However, power down mode is unique to the present invention.

In busy mode mode, the master (host computer) is actively polling the HID (wireless mouse, wireless keyboard, etc.) for data at a polling rate near 100 polls/second, or about once every 16 slot times. Continued user activity (keypad strokes, mouse motion, button presses, etc.) keeps the HID in busy mode. If there has been no activity for a few seconds (determined by particular settings), operation transitions to idle mode.

In idle mode, the HID requests the master (serviced host) to enter SNIFF mode with a SNIFF interval that is chosen based on desired latency and average power consumption. In one operation, the SNIFF interval is 50 ms, or about every 80 slot times. Although the HID can I/O Active immediately after an event, it may have to wait up to 100 mS to transmit its data to the host, and therefore must have enough buffer space to store 100 mS of events. If an event occurs, the HID requests the master to leave SNIFF mode. If there is no further activity for a longer period, the HID transitions from idle mode to suspend mode. Then, the HID is parked.

In suspend mode, a longer beacon interval can be used for a lower power state. When in suspend mode, any user input detected will result in the HID requesting to be unparked and transitioned back to the busy mode. When the HID is parked, it consumes less power than when the host is in SNIFF mode since the HID does not have to transmit. In suspend mode, the HID just listens to the beacons to remain synchronized to the master's frequency hopping clock. As long as the master continues transmitting (meaning the host is not turned off) the HID will remain in suspend mode. If link loss occurs due to the host being turned off without warning, or the host moving out of range, the Lost Link state will be entered.

According to the present invention, the power down mode is also supported. In the power down mode, the power management unit 808 operates the processing unit voltage regulation circuitry 812 and the wireless interface unit voltage regulation circuitry 810 to power down the processing unit 802 and wireless interface unit 804, respectively. These states of operation will be described further with reference to FIGS. 9 and 10.

Figure 9:
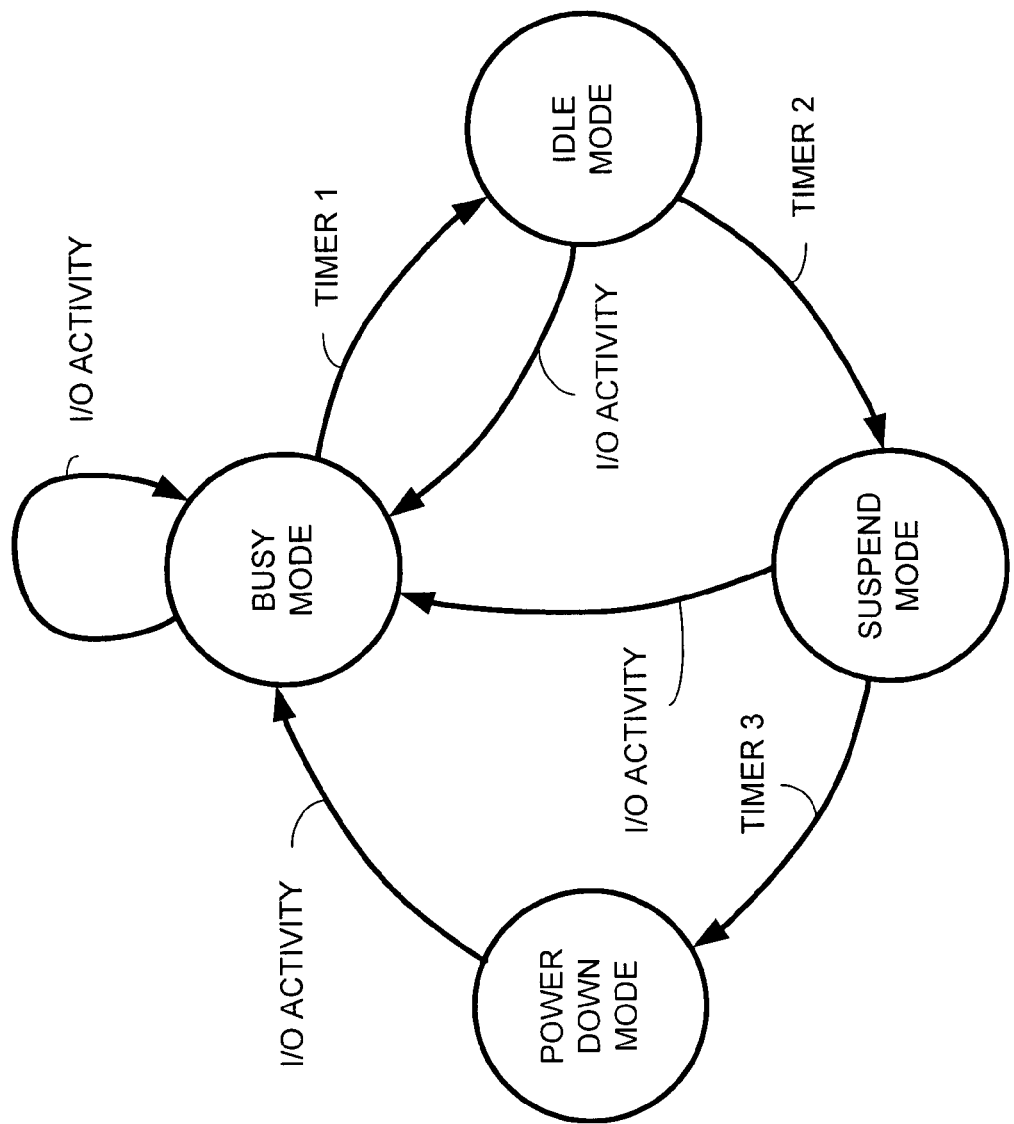
FIG. 9 is a logic diagram illustrating operation according to the present invention.

FIG. 9 is a logic diagram illustrating operation according to the present invention. As illustrated in FIG. 9, a wireless interface device operating according to the present invention operates in four separate power-conserving modes. These power conservation modes include the busy mode, the idle mode, the suspend mode, and the power down mode. The state diagram of FIG. 9 shows how each of these modes is reached during normal operation.

When the wireless interface device is initially powered up, it enters the busy mode of operation. In the busy mode of operation, all features and wireless operations of the wireless interface device are enabled. As long as I/O activity continues, the wireless interface device remains in the busy mode. However, after expiration of a first timer with no I/O activity, the operation moves from the busy mode to the idle mode. Operation will remain in idle mode until the expiration of a second timer or until I/O activity occurs.

If while in the idle mode I/O activity occurs, operation returns to the busy mode. If in the idle mode, if timer 2 expires with no additional I/O activity, suspend mode is entered. While in suspend mode, if I/O activity occurs, operation returns to busy mode. However, if in suspend mode, no additional I/O activity occurs until the expiration of a third timer, power down mode is entered. While in the power down mode, operation will remain in the power down mode until I/O activity occurs. When I/O activity occurs, operation of the wireless interface device will move from the power down mode to the busy mode.

Figure 10:
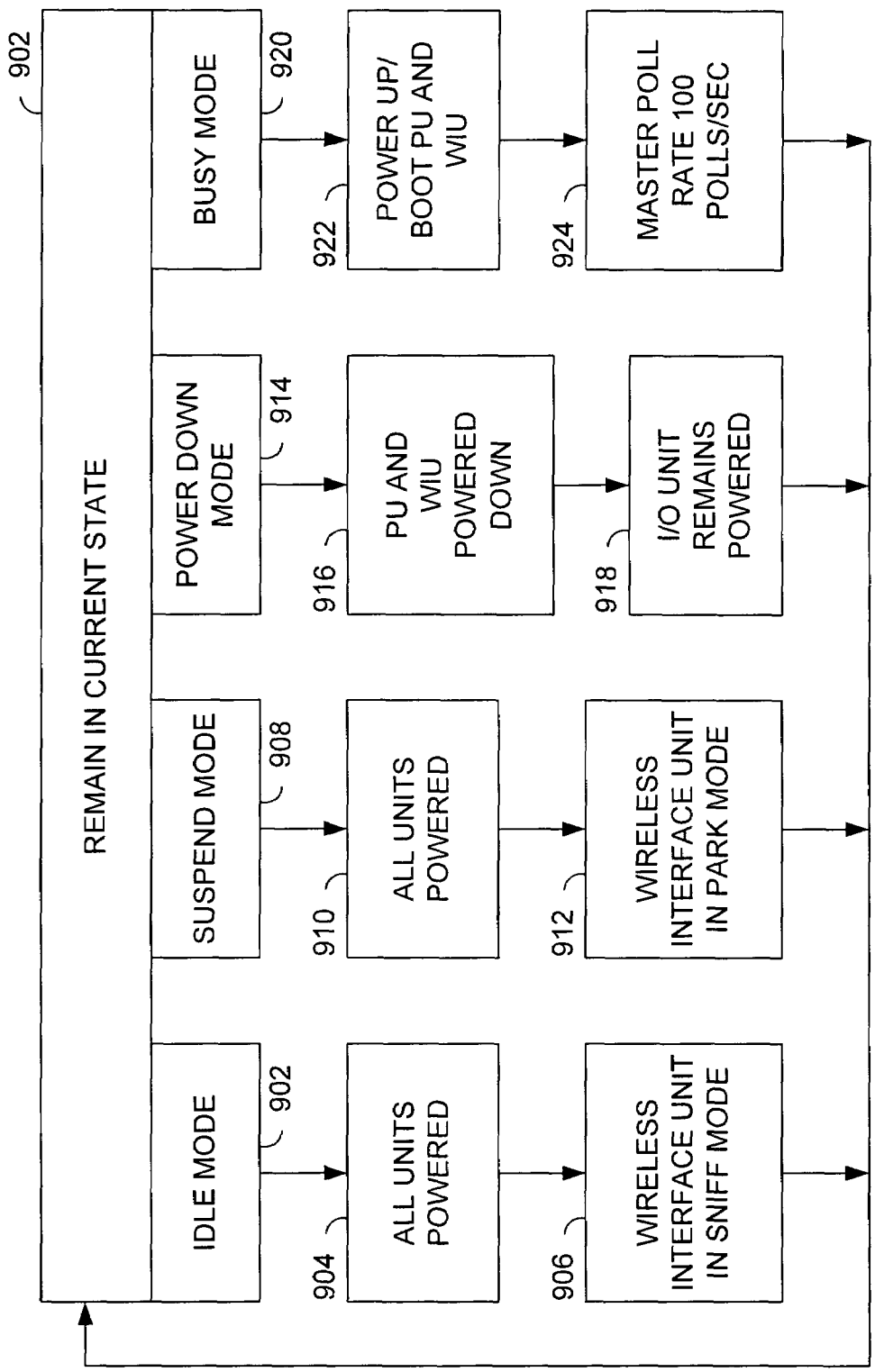
FIG. 10 is a logic diagram illustrating operation according to the present invention in controlling the power consumption of a serviced device.

FIG. 10 is a logic diagram illustrating operation according to the present invention in controlling the power consumption of a serviced device. As shown in FIG. 10, once operation in a particular power conservation state, e.g., busy mode, idle mode, suspend mode, and power down mode has commenced, operation will remain in that state until expiration of respective timer or I/O activity occurs (step 902).

When power conservation operation occurs to move from the busy mode to the idle mode (step 902), all portions of the wireless interface device remain powered (step 904). However, in the idle mode, the wireless interface unit enters a SNIFF mode in which some of its operations are reduced. Such operations were previously described with reference to FIG. 9. Further, additional information regarding this mode is available in the Bluetooth HID standard.

When the operation of the wireless interface device transitions from the idle mode to the suspend mode (step 908), all portions of the wireless interface device remain powered (step 910). However, the wireless interface unit of the wireless interface device enters the park mode, which consumes even less power than does the wireless interface unit when in the sniff mode.

When in the suspend mode, if an additional timer or inactivity period expires, the wireless interface device will transition to the power down mode (step 914). In the power down mode, the processing unit and wireless interface unit will be powered down (step 916). This power down operation will be performed in one embodiment by simply disconnecting a voltage source from the processing unit in the wireless interface unit. One such technique for doing this is described with reference to FIG. 8. In the power down mode, the I/O unit will continue to be powered to allow it to sense the state of the user input device lines.

Finally, from any of the reduced power operating states, when I/O activity is sensed by the I/O block, the wireless input device will transition back to the busy mode (step 920). When such operation occurs, if the components have been powered down, they will be a powered up and will go through their boot operations (step 922). Then, in the busy mode, the wireless interface unit will operate in its normal state in which the master wireless device, i.e., wirelessly enabled host will poll the wireless interface device at 100 times per second. From each of steps 906, 912, 918, and 924, operation returns to step 902 wherein the current power conservation state will be kept until another event occurs.

Figure 11A:
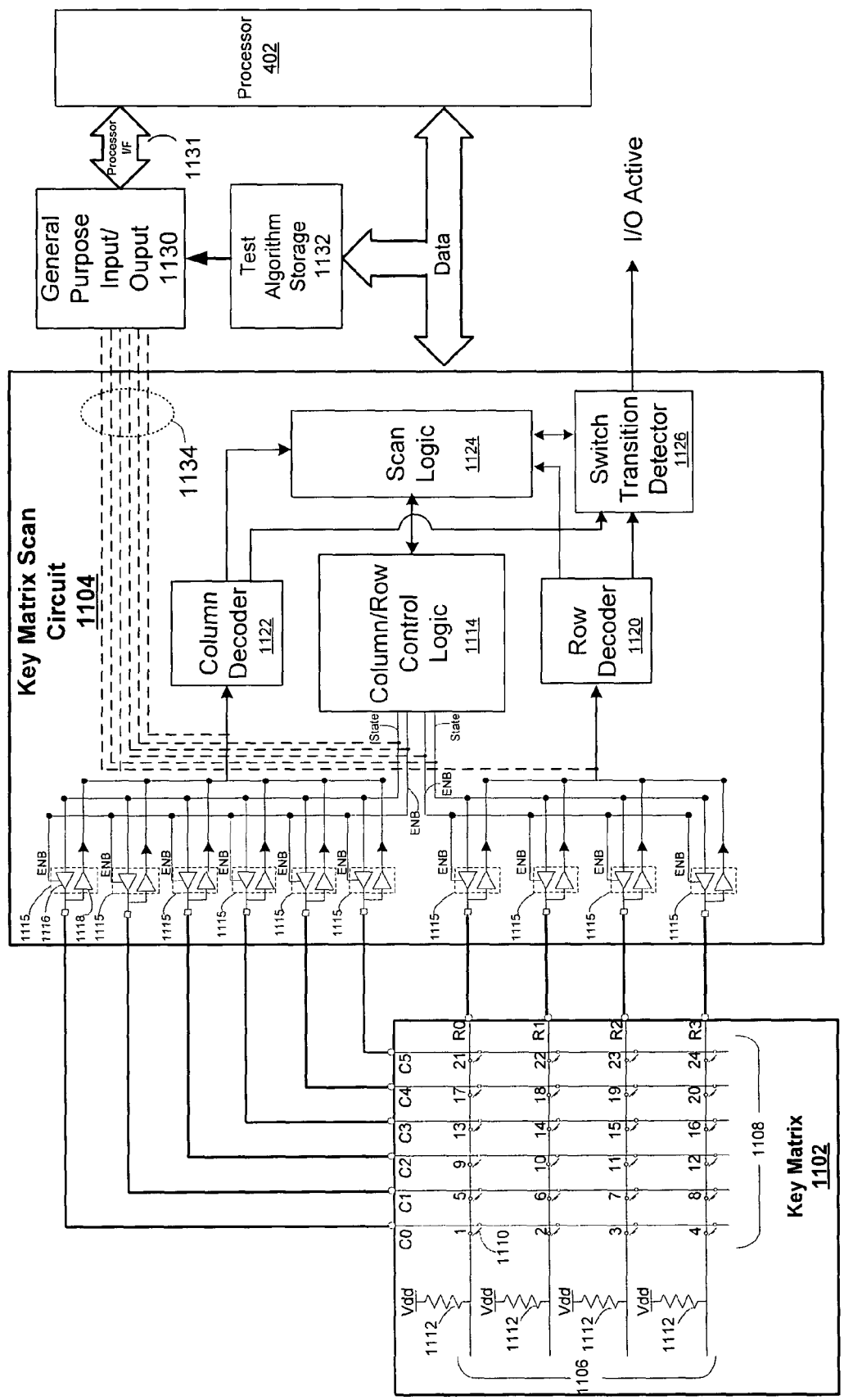
FIG. 11A is an illustration of the GPIO testing system of the present invention operable to test the operation of a key-scan matrix.

FIG. 11A is an illustration of the general purpose input-output testing system of the present invention operably connected to a keyboard switch matrix 1102 that is connected to a key scan circuit 1104. The keyboard matrix 1102 comprises a plurality of columns 1108 and a plurality of rows 1106. In the embodiment shown in FIG. 1A, the plurality of columns 1108 comprises six columns C0-C5 and the plurality of rows comprises four rows, R0-R3. The embodiment illustrated in FIG. 11A shows only a small portion of an actual keyboard matrix and it is understood by those skilled in the art that the number of rows and columns can be increased or decreased depending on the specific application.

A plurality of switches 1110 connect the respective rows and columns when a corresponding key is pressed by a user. In the illustration of FIG. 11A, switch 1110 connects row R0 and column C0 when the switch 1110 is pressed. Although a reference numeral has not been provided for each of the switches, it should be understood that a total of 24 switches 1110 are associated with the intersection of the rows and columns in FIG. 11A. For purposes of discussion, the twenty four illustrative switches 1110 in FIG. 11A will be referred to as Switch 1, Switch 2, . . . , Switch 24. When all of the respective switches in a particular row are open, the row will be pulled "high" by resistor 1112 that is connected to Vdd. Rows R0-R3 provide inputs to row decoder 1120 in the key scan circuit 1104, as will be discussed in greater detail below.

Key matrix scan circuit 1104 comprises column/row control logic 1114 and driver logic 1115 that generate appropriate signals to control the state of the respective columns and rows. Driver logic 1115 comprises a tri-state driver 1116 and a driver 1118. The column/row control logic 1114 generates appropriate "high" and "low" signals that are provided to the inputs of the tri-state drivers 1116. The column/row control logic can change the state of a particular row or column by generating appropriate "enable" signals that control the operation of the tri-state drivers 1116 in the control logic 1115. For example, if the input of the tri-state driver 1116 is "high," the generation of an enable signal will cause the tri-state driver 1116 to apply the "high" signal at its output to drive the column or row "high." Conversely, if the input to the tri-state driver 1116 is "low," the generation of an enable signal will cause that tri-state driver to drive the column or row "low." The enable signals can be global enable signals intended to enable the tri-state drivers for all rows, e.g. ENB_R, or for all columns, e.g. ENB_C. The enable signals also can be directed to a tri-state driver for a particular row, e.g. ENB_R1, or for a particular column, e.g. ENB_C3.

The key scan circuit 1104 also comprises row decoder 1120 and column decoder 1122 that are operable to decode output signals received from the respective rows and columns in the keyboard matrix 1102. The decoded output signals from the row decoder 1120 and the column decoder 1122 are provided to scan logic 1124 which generates a data stream indicating the state of various switches (keys) 1110.

The key scan circuit also comprises a switch transition detection circuit 1126 that receives output signals from the row decoder 1120 and the column decoder 1122. The switch transition detection circuit 1126 is communicatively coupled to the scan logic 1124, which scans the various rows, and columns as described herein below. In addition, the switch transition detection circuit 1126 generates an "I/O Active" signal that is provided to the I/O block to cause the system to transition into the "busy" mode as described herein.

The general purpose input-output interface 1130 is operable to initiate a testing sequence upon receiving an appropriate command from the microprocessor via the processor interface 1131. The specific testing algorithm is received in the test algorithm storage 1132 via the data bus. The test control bus 1134 is operable to communicate commands to the various system components in the key matrix scan circuit 1104 upon execution of the test algorithm. The test algorithm may be in the form of a "minidriver" and the test algorithm storage 1132 can be implemented using various storage media known to those of skill in the art, including read-only memory (ROM) or an electrically erasable programmable read-only memory (EEPROM). As will be understood by those of skill in the art, a driver is a software or firmware program that provides instructions for interpreting commands for transfer of data between a processor and a peripheral device. In recent years, drivers for many applications have grown large, often requiring several megabytes of storage. The minidriver used in the present invention comprises a sequence of test commands that can be stored in 100 thousand bytes or less of memory.

In the method and apparatus of the present invention, the operation of the key-scan logic 1124 and other circuitry within the key matrix scan circuit 1104 can be tested by the GPIO interface by temporarily bypassing or disabling the outputs of the various rows and columns and substituting signals generated by a test algorithm into the input terminals of the key-scan logic via the test control bus 1134. The test signal is processed by the key scan logic circuitry 1124 and a key-scan output signal is generated and transmitted via the data bus for processing. This key-scan output signal is then compared to a known reference output signal to determine if the key-scan logic and associated circuitry is operating properly.

Figure 11B:
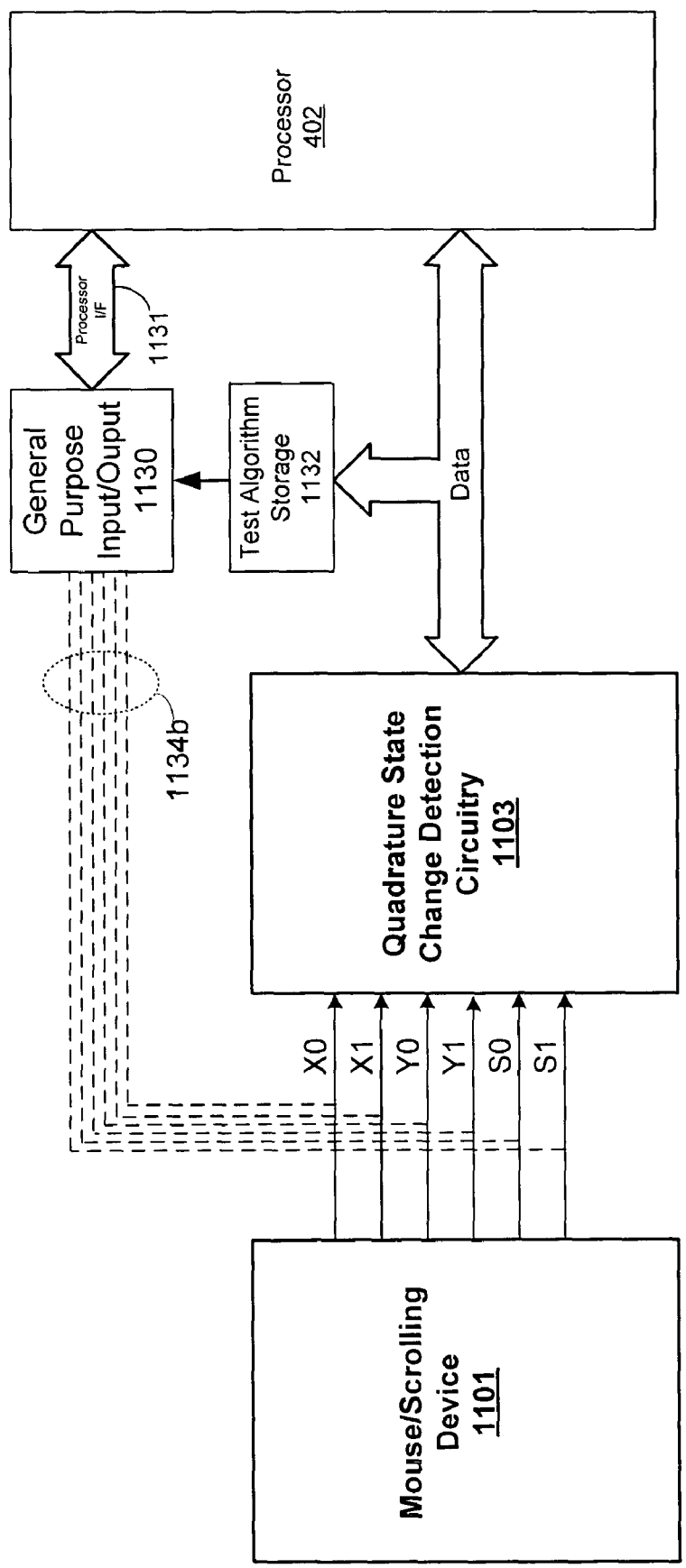
FIG. 11B is an illustration of the GPIO testing system of the present invention operable to test the operation of a user input device such as a computer mouse.

FIG. 11B is an illustration of an alternate embodiment of the present invention wherein the GPIO testing system operates in conjunction with other user devices such as a computer mouse/scrolling device 1101. In this embodiment, optical or mechanical sensors within the mouse/scrolling device 1101 generate motion information signals X0, X1, Y0, Y1, S0, and S1 that are provided to the quadrature state change detection circuitry 1103. The quadrature state change detection circuitry 1103 is operable to provide a position change output signal indicating movement of the sensors in the mouse/scrolling device 1101. In a first state corresponding to normal operation of the mouse/scrolling device, optical or mechanical sensors generate motion information signals that are provided to quadrature state change detection circuitry 1103, which generates output signals that can be used by the host computer to track motion of the mouse/scrolling device 1101. The GPIO testing system of the present invention is operable to transition to a second operating state wherein the motion information signals are temporarily bypassed or disabled and a plurality of test signals are provided via the GPIO to the input of the quadrature state change detection circuitry. In the second operating state, the plurality of test signals are provided by the GPIO via the test signal control bus 1134b to the input of the quadrature state change detection circuitry 1103. The test signals are processed by the quadrature state change detection circuitry 1103 and a quadrature output signal is generated. This quadrature output signal is then processed by the processor 402 and is compared to a known reference output signal to determine if the quadrature state change detection circuitry 1103 and associated circuitry is operating properly.

Figure 12A:
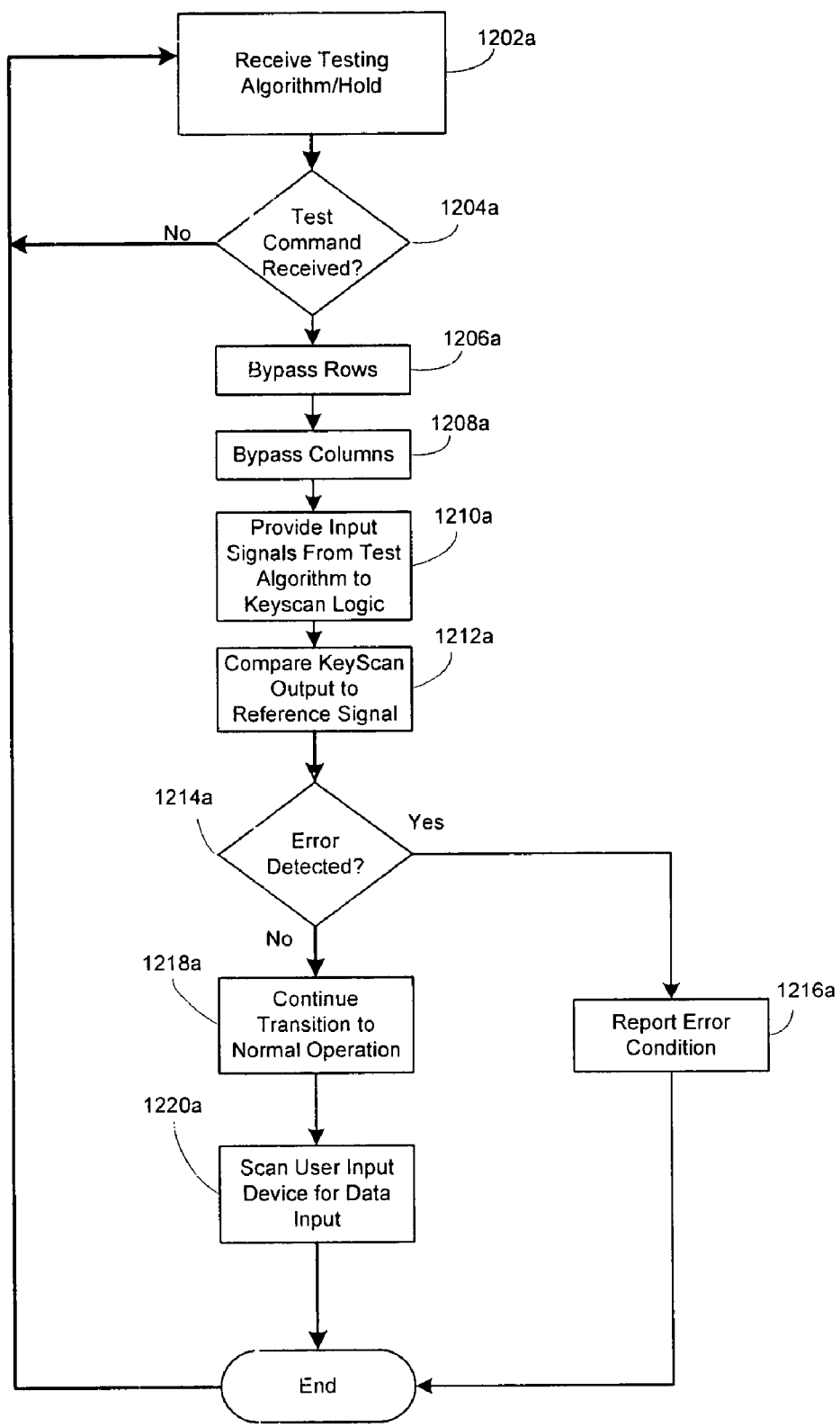
FIGS. 12A and 12B are flowchart illustrations of the data processing steps carried out by the GPIO testing method and apparatus of the present invention.

FIG. 12A is a flowchart representation of the processing steps implemented by the GPIO testing system of the present invention to test the circuitry of a user input device, such as the keyscan circuitry illustrated in FIG. 11A. In step 1202a, the testing algorithm is received in the test algorithm storage 1132. In step 1204a, a test is conducted to determine if a command to execute a testing sequence has been received from the microprocessor via the microprocessor bus. If the result of the test in step 1202a is negative, processing returns to step 1202a and the system holds and/or updates the testing algorithm. If, however, the result of the test conducted in step 1204a is affirmative, the GPIO executes appropriate commands in steps 1206a and 1208a to bypass all of the rows and columns in the key matrix and processing proceeds to step 1210a wherein the signals generated by the testing algorithm are provided as inputs to the keyscan logic for execution. In step 1212a, the output generated by the keyscan logic is compared to a reference signal. In step 1210a, a test is conducted to determine whether the comparison of the keyscan output signal to the reference signal indicates that an error has occurred. If the result of the test conducted in step 1214a indicates that an error has occurred, processing proceeds to step 1216a wherein an error condition is reported. If, however, the test conducted in step 1214a indicates that no error has been detected, processing proceeds to step 1218a wherein the system continues to transition to normal operation. In step 1220a, normal processing proceeds and the user input device is scanned for data input and the system returns to step 1202a to await further indication of initiation of a testing sequence.

Figure 12B:
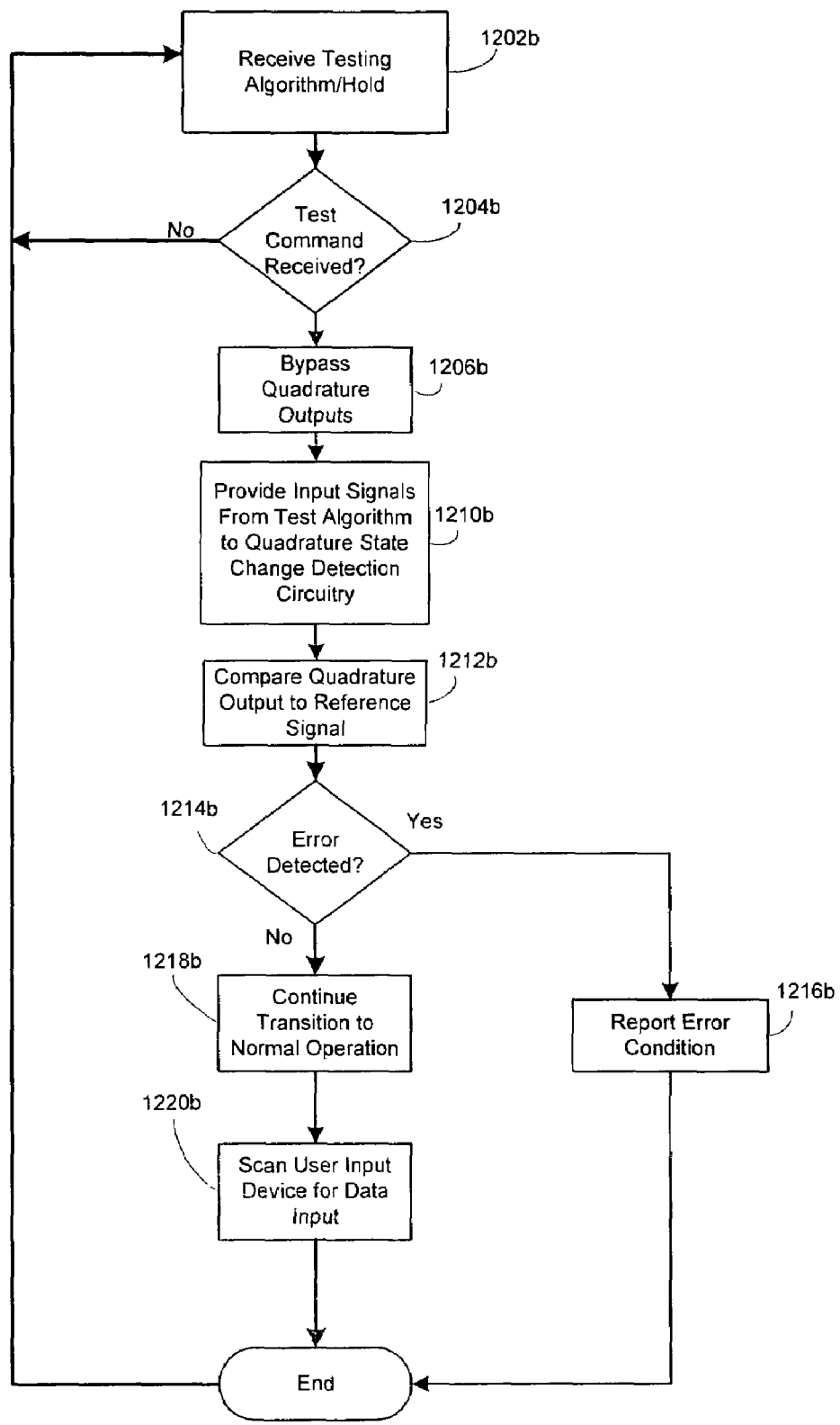

FIG. 12B is a flowchart representation of the processing steps implemented by the GPIO testing system of the present invention to test the quadrature state transition circuitry illustrated in FIG. 11B. In step 1202b, the testing algorithm is received in the test algorithm storage 1132. In step 1204b, a test is conducted to determine if a command to execute a testing sequence has been received from the microprocessor via the microprocessor bus. If the result of the test in step 1202b is negative, processing returns to step 1202b and the system holds and/or updates the testing algorithm. If, however, the result of the test conducted in step 1204b is affirmative, the GPIO executes appropriate commands in step 1208*b* to bypass the quadrature output signals of the mouse/scrolling device 1101 and processing proceeds to step 1210*b* wherein the signals generated by the testing algorithm are provided as inputs to the quadrature state change detection circuitry 1103. In step 1212*b*, the output generated by the quadrature state change detection circuitry 1103 is compared to a reference signal. In step 1210*b*, a test is conducted to determine whether the comparison of the quadrature output signal to the reference signal indicates that an error has occurred. If the result of the test conducted in step 1214*b* indicates that an error has occurred, processing proceeds to step 1216*b* wherein an error condition is reported. If, however, the test conducted in step 1214*b* indicates that no error has been detected, processing proceeds to step 1218*b* wherein the system continues to transition to normal operation. In step 1220*b*, normal processing proceeds and the user input device is scanned for data input and the system returns to step 1202*b* to await further indication of initiation of a testing sequence.

The GPIO testing method and apparatus of the present invention is particularly useful for ensuring error-free operation of wireless user input devices. In a wirelessly enabled system, a wireless interface device services communications between a wirelessly enabled host and at least one user input device. The wireless interface device includes a wireless interface unit, a processing unit, an input/output unit and a power management unit. The wireless interface unit wirelessly interfaces with the wirelessly enabled host using a communication interface protocol. The power management unit operably couples to the wireless interface unit, the processing unit, and the input/output unit. The power management unit operates to control the power consumption of the wireless interface unit and the processing unit by powering down the wireless interface device and the processing unit. The input/output unit remains powered to detect user input. When user input is detected, the wireless interface unit and processing unit are powered-up for normal operations.

The method and apparatus of the present invention can be implemented to test the operation of circuitry after the user input device transitions from a powered-down state to normal operating state. The GPIO testing system can also be used to test the operation of the circuitry after the user input device has been powered down for a maintenance operation, such as battery replacement. While the GPIO method and apparatus of the present invention has been discussed thus far in connection with wireless devices, those of skill in the art will appreciate that the GPIO testing system of the present invention can be used to test circuitry in a number of situations, such as during manufacturing, during design and development activities related to stress testing and also in various field testing operations.

The invention disclosed herein is susceptible to various modifications and alternative forms. Specific embodiments, therefore, have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

The invention claimed is:

1. A user input device comprising:
   a switch matrix having a plurality of rows and columns;
   scan logic operable to detect signals corresponding to operation of said rows and columns of said switch matrix and to generate an output signal in response thereto;
   a test control bus operable to provide test signals to said scan logic;
   a storage module for storing an executable test sequence program for generating a plurality of signals corresponding to a known operating condition of said switch matrix;
   a general purpose input-output (GPIO) module operable to provide said a plurality of test signals to said scan logic via said test control bus; and
   a processor operable to initiate execution of said executable test sequence program and further operable to compare said output signal of said scan logic to a known reference signal to obtain an indication of the operating condition of said scan logic.

2. The user input device of claim 1, wherein the test signals provided by the GPIO module are generated using a minidriver.

3. The user input device of claim 1, wherein the scan logic operates in first and second states, wherein said scan logic receives signals from said switch matrix in said first state and wherein said scan logic receives test signals from the test control bus in said second state.

4. The user input device of claim 3, wherein the GPIO module is operable to switch said scan logic from said first state to said second state in response to control signals generated by said processor.

5. A system that services communications between a wirelessly enabled host and at least one user input device, comprising:
   a wireless interface unit that wirelessly interfaces with the wirelessly enabled host;
   a processing unit operably coupled to the wireless interface unit; an input/output unit operably coupled to the wireless interface unit and to the processing
   unit, wherein the input/output unit also operably couples to the user input device; and
   a user input device, comprising:
      a switch matrix having a plurality of rows and columns;
      scan logic operable to detect signals corresponding to operation of said rows and columns of said switch matrix and to generate an output signal in response thereto;
      a test control bus operable to provide test signals to said scan logic;
      a storage module for storing an executable test sequence program for generating a plurality of signals corresponding to a known operating condition of said switch matrix;
      a general purpose input-output (GPIO) module operable to provide said a plurality of test signals to said scan logic via said test control bus; and
      a processor operable to initiate execution of said executable test sequence program and further operable to compare said output signal of said scan logic to a known reference signal to obtain an indication of the operating condition of said scan logic.

6. The user input device of claim 5, wherein the test signals provided by the GPIO module are generated using a minidriver.

7. The user input device of claim 5, wherein the scan logic operates in first and second states, wherein said scan logic receives signals from said switch matrix in said first state and wherein said scan logic receives test signals from the test control bus in said second state.

* * * * *